June 4, 1946. J. D. CWICIG 2,401,465
GRAIN LOADING AND UNLOADING DEVICE
Filed Oct. 13, 1944 2 Sheets-Sheet 2

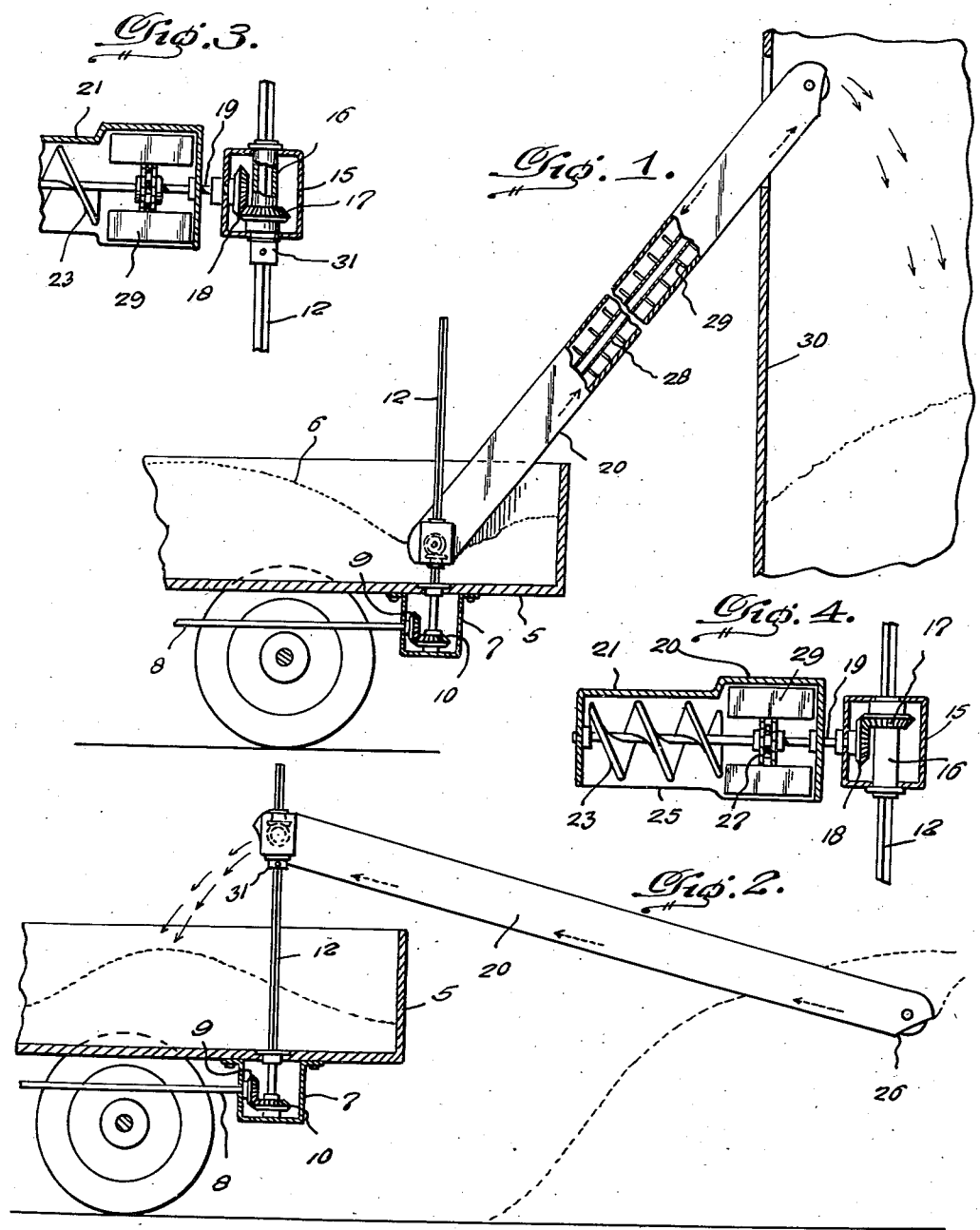

Inventor
John D. Cwicig,
By McMorrow and Brennan
Attorneys

Patented June 4, 1946

2,401,465

UNITED STATES PATENT OFFICE 2,401,465

GRAIN LOADING AND UNLOADING DEVICE

John D. Cwicig, Luray, Kans.

Application October 13, 1944, Serial No. 558,551

2 Claims. (Cl. 214—83)

The present invention relates to new and useful improvements in devices for loading and unloading grain and similar loose material from a motor driven vehicle and has for its primary object to provide a power driven conveyor elevator embodying a combined intake and discharge structure at each end thereof whereby either end of the elevator may be used as the intake or delivery end and by reversing the direction of travel of the conveyor to pick up and discharge material from a wagon into a storage bin, or to pick up the material from the ground or bin and load the same into the vehicle.

An important object of the present invention is to provide a novel reversible drive mechanism for the endless conveyor.

A still further object is to provide an apparatus of this character of simple and practical construction, which is efficient and reliable in performance, relatively inexpensive to manufacture and operate and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a fragmentary side elevational view showing the device in position for unloading grain from a vehicle into a storage bin and with parts broken away and shown in section.

Figure 2 is a similar view showing the device used for loading the vehicle.

Figure 3 is a fragmentary sectional view through the inner end of the conveyor arranged in its unloading position.

Figure 4 is a similar view showing the drive connection for the conveyor arranged in its loading position.

Figure 5:
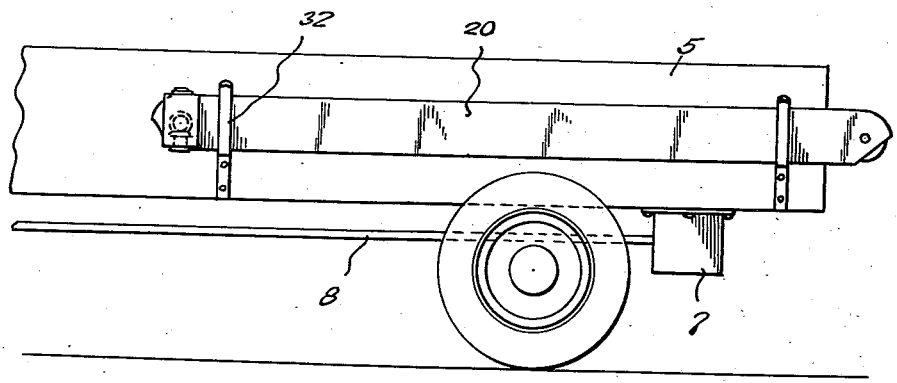
Figure 5 is a fragmentary side elevational view of the vehicle showing the conveyor elevator supported thereon when not in use.
Figure 6:
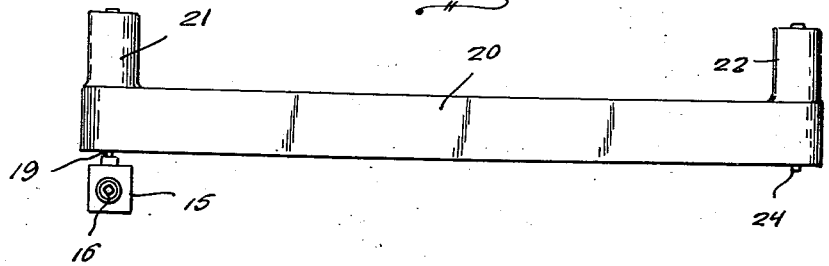
Figure 6 is a plan view of the conveyor elevator.
Figure 7:
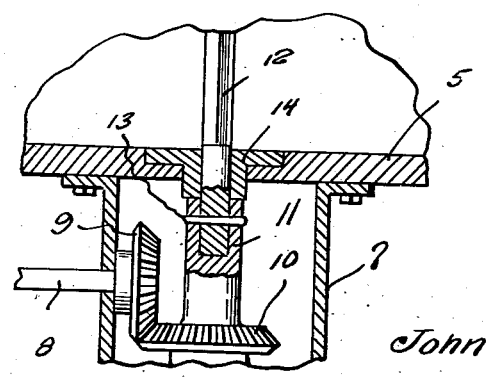
Figure 7 is a sectional view through the gear housing for the drive shaft of the elevator.

Referring now to the drawings in detail wherein for the purpose of illustration I have disclosed a preferred embodiment of the invention, the numeral 5 designates the body of a vehicle adapted to contain grain or other loose material 6, the bottom of the body, adjacent its rear end, having a gear housing 7 attached thereto and in which the rear end of a driven shaft 8 is journaled extending forwardly of the gear housing for connection through a conventional power take-off (not shown) with the power plant of the vehicle.

A bevel gear 9 is secured to the rear end of the shaft 8 engaging a similar gear 10 journaled in the bottom of the gear housing and having an upwardly extending socket 11 adapted for receiving the lower end of a vertical shaft 12 detachably secured to the gear 10 by means of a pin 13. The lower end of the shaft 12 is journaled in a bearing 14 supported in the bottom of the vehicle.

The upper portion of the shaft 12 is square shaped in cross section and extends upwardly through the body 5 of the vehicle to a point substantially above the latter.

A gear housing 15 has a sleeve 16 journaled therein provided with a bore of square shape in cross section for slidably receiving the square shaped portion of the shaft 12, the sleeve having a bevel gear 17 secured thereto for driving a similar gear 18 on one end of a shaft 19 which projects outwardly through one side of the housing 15 and transversely into the inner end of an elongated conveyor housing 20.

Each end of the housing 20 is formed with laterally extending cylindrical housings 21 and 22 in each of which a screw conveyor 23 is mounted, the conveyor 23 in the housing 21 being secured to the shaft 19 while the conveyor in the housing 22 is secured on a like shaft 24 journaled in the conveyor housing 20.

One side of each of the extensions 21 and 22 is formed with an opening 25.

Also secured to one shaft 19 is a sprocket 27 for driving an endless chain 28 trained over a similar sprocket (not shown) on the other shaft 24, the chain being provided at spaced intervals with conveyor buckets, paddles or the like 29.

In the operation of the device with the inner end of the conveyor mounted in the position as shown in Figure 1 of the drawings, the conveyor will be driven through the shafts 8 and 12 to rotate the sleeve 16 and through the gears 17 and 18 the shaft 19 will be rotated for operating the conveyor through the chain 28. The inner end of the conveyor is permitted to gravitate on the shaft 12 so that the screw conveyor 23 will pick up grain 6 from the body 5 of the vehicle through the opening 25 of the lateral extension 21 and move the grain toward the buckets or paddles 29 of the conveyor for elevating the same and discharging the grain through the similar opening at the outer end of the conveyor into a storage bin or the like 30.

When it is desied to use the conveyor as a loading device, the inner end of the conveyor and gear housing 15 is raised upwardly on the shaft 12 and removed therefrom and the position of the gear housing 15 reversed from that shown in Figures 1 and 3 of the drawings to the position shown in Figures 2 and 4 whereby the shaft 19 will be driven in a reverse direction for reversing the direction of travel of the buckets or paddles 28 of the conveyor. The inner end of the conveyor is then supported on the shaft 12 adjacent its upper end, as shown in Figure 2 of the drawings, by means of a collar 31 and grain or other material may then be loaded from the ground or from a bin or the like into the vehicle.

The conveyor may be conveniently carried at the side of the vehicle, when not in use, by means of brackets 32.

It is believed the details of construction, operation and advantages of the device will be readily understood from the foregoing without further detailed explanation.

Having thus described the invention, what I claim is:

1. A loading and unloading conveyor, in working relation to a vehicle body having a power-driven vertical shaft located inside thereof, said conveyor having reversible drive means at its inner end and operatively connected to said power-driven vertical shaft of the vehicle body so as to drive the conveyor selectively in either one of two opposite directions, said drive means in its connection being arranged and adapted, in one of its directional conveyor operations, to move vertically up and down freely on said power-driven shaft of the vehicle and correspondingly carrying the inner end of said conveyor up and down therewith, said connection also having provision for vertical swinging movement of the conveyor from its supported inner end, and disengageable and removable means on said power-driven shaft of the vehicle for supporting the inner end of said conveyor adjustably at different elevations on said shaft.

2. A loading and unloading conveyor, in working relation to a vehicle body having a power-driven vertical shaft located inside thereof, said conveyor comprising an elevator including an elongated housing having a conveyor operatively mounted therein and arranged and adapted to move material lengthwise of the elevator selectively in opposite directions, reversible drive means on said power-driven vertical shaft of the vehicle and arranged and adapted to support the inner end of said elevator housing longitudinally slidable on said shaft and having an operative connection with the elevator conveyor to actuate the latter in either of its opposite directions, the elevator having like provision at its opposite ends for intake and discharge of material conveyed in either direction therethrough and the connected reversible drive means and the elevator being applicable as a complete unit to and detachable from said power-driven vertical shaft of the vehicle, the working connection between the elevator housing and the reversible drive means being such that the housing is swingable to various inclined positions above and below a horizontal plane with respect to the pivotal axis of the connection, and means applicable to and detachable from said power-driven vertical shaft for supporting the inner end of the conveyor and its said supporting drive means at different elevations on said shaft.

JOHN D. CWICIG.